United States Patent [19]

Wahls

[11] Patent Number: 4,480,430
[45] Date of Patent: Nov. 6, 1984

[54] ASPARAGUS PICKING MACHINE

[76] Inventor: Stephen L. Wahls, R.R. 1, Mitchellville, Iowa 50169

[21] Appl. No.: 447,982

[22] Filed: Dec. 8, 1982

[51] Int. Cl.³ ............................................. A01D 45/00
[52] U.S. Cl. ................................................. 56/327 A
[58] Field of Search ............... 56/327 A, 27.5; 171/56

[56] References Cited

U.S. PATENT DOCUMENTS

| | | | |
|---|---|---|---|
| 3,328,943 | 7/1967 | Marmorine | 56/327 A |
| 3,426,516 | 2/1969 | Lyons | 56/327 A |
| 3,452,525 | 7/1969 | Francis | 56/327 A |
| 3,641,753 | 2/1972 | Lyons | 56/327 A |
| 3,855,764 | 12/1974 | Helbing | 56/327 A |
| 3,893,285 | 7/1975 | Seeley | 56/327 A |
| 3,927,514 | 12/1975 | Sammet | 56/327 A |

*Primary Examiner*—Jay N. Eskovitz
*Attorney, Agent, or Firm*—Zarley, McKee, Thomte, Voorhees & Sease

[57] ABSTRACT

The asparagus picking machine of the present invention comprises a frame assembly which is adapted to be carried by a vehicle adjacent to the ground. A continuous picker belt assembly is mounted on the frame assembly and is trained around a forward sprocket, a rearward sprocket and a chain guide means which is located between and below the two sprockets. The picker belt assembly comprises a plurality of elongated spaced apart parallel picker bars extending parallel to the rotational forward and rearward axes of the sprockets. The belt assembly includes chains which interconnect the spaced apart picker bars. The chains are trained around the forward and rearward sprockets and are guided through the guide means so as to travel in a downward and rearward inclined path from the forward sprocket to the guide means and then through an S-shaped pattern as the chain passes through the guide means. The asparagus protruding upwardly from the ground extends between the spaced apart picker bars and is snapped off when the picker bars move into the S-shaped pattern caused by the guide.

10 Claims, 6 Drawing Figures

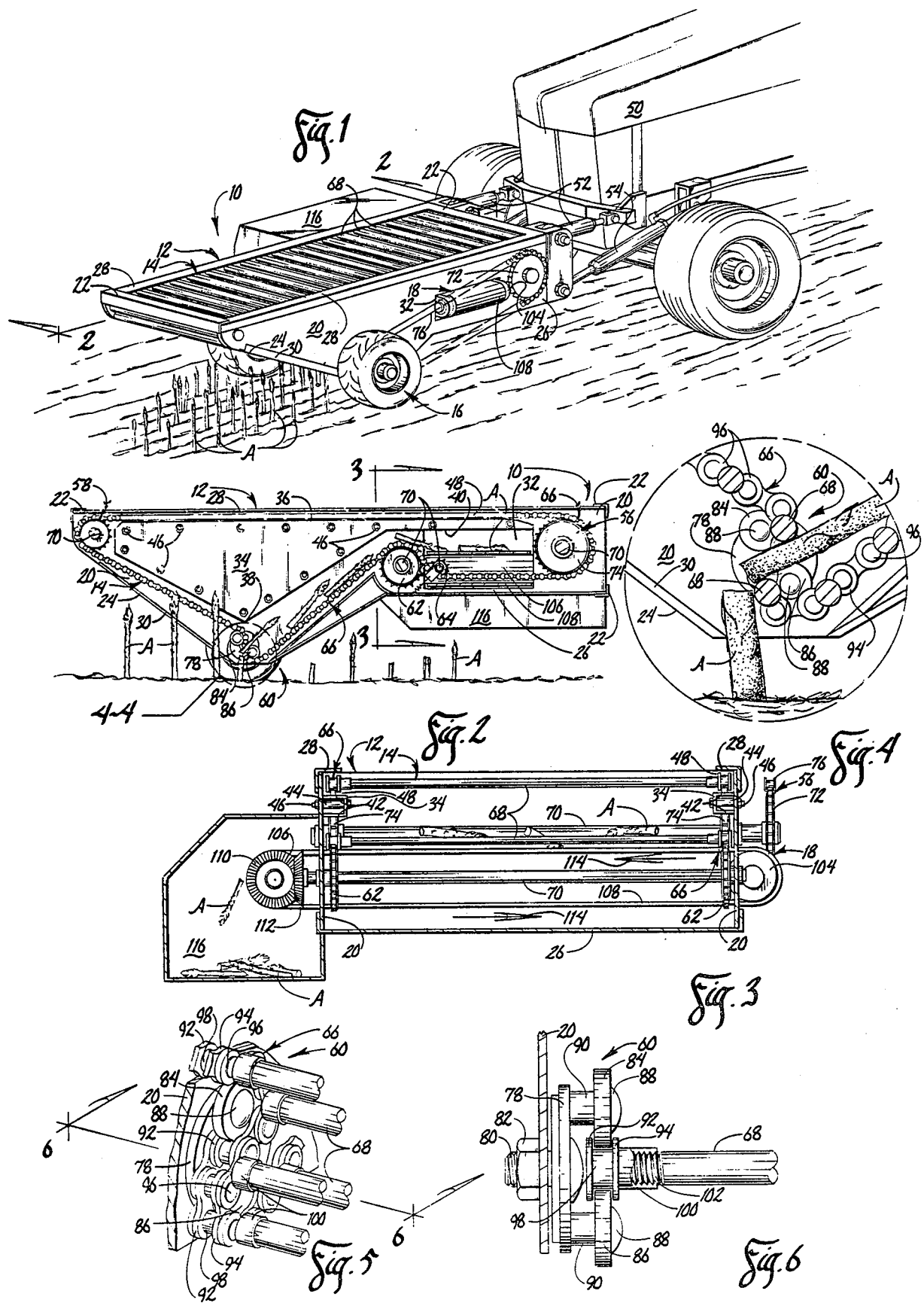

ASPARAGUS PICKING MACHINE

BACKGROUND OF THE INVENTION

The present invention relates to a machine for picking asparagus.

Several problems are encountered in the picking of asparagus. The asparagus shoots protrude upwardly from the ground, and are often not uniform. Some of the shoots come up through the ground earlier than others, and therefore are taller and more mature than others. Consequently for any given asparagus patch, the asparagus within that patch varies considerably as to size and maturity.

This presents several problems in large scale growing of asparagus for market. The person picking the asparagus does not want to pick the young sprouts which are just beginning to come up through the ground. Furthermore, the older, more mature sprouts should be picked either at a higher level or not picked at all. This is because the asparagus becomes tough at its lower end as it grows and becomes more mature. The toughness rises upwardly through the stalk as the sprout becomes more mature. It is therefore desirable to pick the sprout at the point where it is tender and brittle.

Also, it is desirable to pick the sprouts which have the greatest thickness. For example, it may be desirable to pick only those sprouts which have a diameter of a half an inch or greater.

Presently, the most commonly used method for picking asparagus is by hand, which is an expensive and time consuming method. Furthermore, because it takes so long to cover a patch when picking by hand, it is not possible to make several passes over the patch within a short period of time.

Therefore, a primary object of the present invention is the provision of an improved asparagus picking machine.

A further object of the present invention is the provision of an asparagus picking machine which can be adjusted so that it will pick only those sprouts which have a diameter greater than a predetermined diameter.

A further object of the present invention is the provision of an asparagus picking machine which will select between the asparagus sprouts which are too young, those which are at the proper size and maturity, and those which are too old.

A further object of the present invention is the provision of an asparagus picking machine which will snap off the sprouts immediately above the point where the stalk has become hardened.

A further object of the present invention is the provision of a device which will not damage or bring in contact with the ground the picked asparagus spears.

A further object of the present invention is the provision of a device which not only picks the asparagus, but carries the asparagus sprouts away to a hopper for storage.

A further object of the present invention is the provision of a device which is capable of being adjusted for picking asparagus of different diameters, and of different heights.

A further object of the present invention is the provision of a device which is economical to manufacture, durable in use and efficient in operation.

SUMMARY OF THE INVENTION

The present invention comprises a frame assembly, which supports a forward sprocket and a rearward sprocket. Between the two sprockets and below them are a pair of guide rollers. A snapper chain assembly is trained around the two sprockets and the guide rollers for continuous movement therearound. The snapper assembly comprises a plurality of snapper bars which extend transversely across the frame assembly and which are connected at their opposite ends by a pair of continuous chains. The chains are guided around the sprockets and around the guide rollers. The snapper assembly travels in a path which is approximately horizontal as it moves from the rearward sprocket to the forward sprocket. Then the assembly extends downwardly and rearwardly in an inclined path until it reaches the guide rollers. The guide rollers are positioned so as to cause the chain and the snapper bars to move in a path which is approximately S-shaped. After the chain has passed through the guide rollers, it passes upwardly and rearwardly to a cross-conveyor and then passes onward to the rear sprocket where it repeats the entire cycle again. The frame assembly has ground engaging wheels which permit the assembly to move forward through the asparagus field. The asparagus spears extend upwardly through the spaces between the snapped bars during the time that the snapper bars are moving downwardly and rearwardly from the front sprocket to the guide rollers. At the time that the snapper bars reach the guide rollers, the asparagus spears are protruding upwardly between the spaces of the snapper bars. When the snapper bars go through their S-shaped path, they snap off the asparagus sprouts and the sprouts fall onto the snapper bars and are carried upwardly and rearwardly to the conveyor. The cross-conveyor carries the sprouts to a hopper which may be emptied periodically.

BRIEF DESCRIPTION OF THE FIGURES OF THE DRAWINGS

FIG. 1 is a perspective view of the asparagus picking machine of the present invention.

FIG. 2 is a sectional view taken along line 2—2 of FIG. 1.

FIG. 3 is a sectional view taken along line 3—3 of FIG. 2.

FIG. 4 is an enlarged detail view of an asparagus spear being snapped off by the snapper bars.

FIG. 5 is a detailed perspective view of the guide rollers used for guiding the chain in an S-shaped path.

FIG. 6 is a sectional view taken along line 6—6 of FIG. 5.

DETAILED DESCRIPTION OF THE PREFERRED EMBODIMENT

The numeral 10 generally designates the asparagus picking machine of the present invention. Machine 10 comprises a frame assembly 12, a snapper chain assembly 14, a wheel and axle assembly 16, and a cross-conveyor assembly 18.

Frame assembly 12 comprises a pair of spaced apart side frame members 20 which are interconnected by a pair of cross angles 22 at each end thereof. Side frame members 20 each include a downwardly extending portion 24, and an elevated rearward portion 26. In cross section, the upper edge of each side frame member 20 includes an inwardly projecting flange 28, and a similarly inwardly extending flange 30 is provided at the leading edge of each side frame member 20.

The rearward elevated portion 26 of each side frame member 20 includes a rectangular conveyor opening 32 which is adapted to receive cross conveyor assembly 18.

Bolted to the inside surfaces of plates 20 are a pair of reinforcing plates 34. Each plate 34 includes a horizontal upper edge 36, a downwardly projecting triangular edge 38, and a rearwardly extending horizontal lower edge 40. Extending along the edges 36, 38, 40 of reinforcing plate 34, is an inwardly projecting flange 42 which can be seen in cross section in FIG. 3. A plurality of spacer bushings 44 and bolts 46 secure plate 34 to plate 20 in spaced apart relation thereto.

As can be seen in FIG. 3, a chain receiving channel 48 is provided by the spaced apart inwardly extending flange 28 of plate 20 and the inwardly projecting flange 42 of plate 34.

Frame assembly 12 is shown in FIG. 1 to be mounted to the forward end of a tractor 50 by means of a plurality of hydraulic cylinders 52, 54. However, frame assembly 12 could be self-propelled, or could be pulled from the rear of a vehicle without detracting from the operability of the invention. Similarly, it could be suspended beneath the tractor 50 if desired.

Snapper chain assembly 14 comprises a rearward sprocket assembly 56, a forward sprocket assembly 58, a guide roller assembly 60, a pair of idler sprockets 62, 64, a pair of snapper chains 66, and a plurality of snapper bars 68. Sprocket assemblies 56, 58 62 and 64 are mounted on axles 70 which extend transversely between the spaced apart side frame members 20 of frame assembly 12. Rearward sprocket assembly 56 includes a drive sprocket 72 and a pair of rearward chain sprockets 74, all of which are fixed to shaft 70.

A drive chain 76 is trained around drive sprocket 72 and around a corresponding sprocket (not shown) connected to wheel assembly 16. Thus, rotation of wheel assembly 16 causes drive sprocket 72 to be rotated and consequently causes the chain sprockets 74 also to be rotated by virtue of their being fixed to shaft 70.

Snapper chains 66 are trained around the rearward sprockets 74, of rearward sprocket assembly 56, and are also trained around the sprockets of the forward sprocket assembly 58. The chains then extend downwardly in an inclined path to the guide roller assembly 60, and thence upwardly to idler sprockets 62, 64. From idler sprocket 62, 64, the chains return to the rearward sprockets 74.

The guide roller assembly 60 is shown in detail in FIGS. 5 and 6. It includes a circular mounting plate 78. Extending through the center of circular mounting plate 78 is a bolt 80 having a nut 82 threaded thereon. Bolt 80 extends through bolt mounting plate 78 and one of the side frame members 20. Bolt 80 and nut 82 provide adjustable means for adjusting the rotational position of the mounting plate 78 with respect to the side frame members 20. A friction plate 83 is adjacent to side frame member 20.

Rotatably mounted to plate 78 are a pair of guide rollers 84, 86 which are mounted thereon by means of axle pins 88 and bushings 90. Rollers 84, 86 are spaced apart from one another a short distance. The rotational position of plate 78 is chosen so that one of the rollers 84, 86 is positioned above the other of the rollers 84, 86.

FIGS. 5 and 6 also show the details of the snapper chains 66 and their connection to the snapper bars 68.

Each snapper chain 66 is constructed similar to a bicycle chain and includes a pair of side links 92, 94 connected by a chain pin 96 and separated by a chain bushing 98. The thickness of guide rollers 84, 86 is such that it fits in the space between the spaced apart chain links 92, 94 and rollers against the bushing 98 of the chain.

Welded or otherwise fixed to side link 94 is a threaded receptacle 100 which threadably receives the threaded end 102 of one of the snapper bars 68.

Cross conveyor assembly 18 comprises a pair of conveyor rollers 104, 106 which are mounted for rotation about an axis which is perpendicular to the rotational axes of sprocket assemblies 56, 58. A cross-conveyor belt 108 is trained around rollers 104, 106 and extends transversely across frame assembly 12 through the conveyor opening 32 provided in side frame members 20. A gear 110 is provided on roller 106 and engages a corresponding gear 112 on shaft 70 of idler sprocket 62. Thus, rotation of idler sprocket 62 causes rotation of roller 106 and correspondingly causes the cross conveyor belt 108 to move in the direction designated by arrow 114. The upper surface of conveyor belt 108 is positioned adjacent the upper parametric edge of idler wheel 62 so that asparagus sprouts designated by the letter "A" are deposited on the conveyor belt 108 as they are carried upwardly over sprocket 62 by snapper bars 68, all as shown in FIGS. 2 and 3. The conveyor belt 108 deposits the sprouts A in a hopper 116 which retains the picked asparagus and accumulates it until it can be emptied at a later time.

In operation, the picking machine 10 is moved across or through a field of asparagus having a number of asparagus sprouts A protruding upwardly therefrom. These asparagus sprouts will vary in diameter, height and maturity, the more mature plants generally being taller. Furthermore, each plant will begin to acquire a toughness adjacent its lower end as it gains more maturity. Initially, each sprout is tender and brittle along its entire length, but as the plants get older, the lower ends begin to acquire more toughness and less brittleness, and this condition rises in the plant until at full maturity the plant is fibrous and tough along its entire length. For marketing purposes, it is desirable to snap the sprout immediately above the tough portion of the plant.

As the machine is moved through the field, the wheel assemblies 16 drive the drive sprocket 72 which in turn drives the snapper chain assembly 14. As the chain assembly passes over the forward sprocket 58, it moves downwardly in a downwardly and rearwardly inclined path. The path takes the chain downwardly below the level of the tops of the asparagus sprouts A. The asparagus sprouts protrude upwardly through the spaces between the bars of the chain as shown in FIG. 2. When the chain and snapper bars reach the guide rollers 84, 86, the chain moves through an S-shaped pattern and as shown in FIG. 4, this S-shaped pattern causes the asparagus sprout A to be snapped off much in the same motion as would occur were the sprout to be snapped off between the thumb and forefinger. The snapped-off sprouts A are extending in a direction which is transverse to the longitudinal axis of the bars 68, and therefore it is not permitted to fall between the spaces. Accordingly, it is carried upwardly by the chain assembly until it reaches the idler sprocket 62 at which point it is deposited on the conveyor belt 108 and is transported transversely into the hopper 116.

The relative dimensions of the sprockets in machine 10 are chosen so that the movement of the snapper chain assembly 14 as it passes from forward sprocket 58 to guide roller assembly 60 is at a velocity which causes the snapper bar 68 to remain approximately stationary with respect to the asparagus sprouts A. Thus, as the wheel assemblies 16 roll across the field, the chain assembly moves rearwardly and downwardly towards guide assembly 60. Its movement is such that the sprouts A can protrude upwardly between the snapper bars 68 prior to the time that the chain reaches guide assembly 60.

Guide assembly 60 can be adjusted so that it will provide the desired snapping action. Adjustment may be accomplished by loosening nut 82 and rotating plate 78 until the rollers 84, 86 achieve the desired orientation. In the drawings, roller 84 is shown to be above and forwardly of roller 86. The particular angle between rollers 84 and 86 may be adjusted by rotating the plate 78. In order to achieve snapping of the thinnest sprouts, it would be necessary to rotate plate 78 until rollers 84, 86 are approximately vertically disposed above one another. By rotating them to a more inclined position, it is possible to achieve snapping of the thicker sprouts, but to permit the thinner sprouts to pass through. If the rollers 84, 86 are disposed approximately horizontally with respect to one another, no snapping at all would be achieved.

Similarly. it is possible to reverse the orientation of rollers 84, 86 so that roller 86 is above and rearwardly of roller 84. In this situation, it would be necessary to reverse the progression of the chain as it passes through rollers 84, 86. The chain should pass over the uppermost roller and should pass under the lowermost roller in order to achieve the proper snapping action. Thus, in the position of rollers 84, 86 which is shown in FIG. 4, chain 66 passes above roller 84 and below roller 86. If the rollers were reversed so that roller 86 was above and rearwardly of roller 84, the chain then would pass under roller 84 and thence upwardly and over roller 86. In this orientation, the snapping action would snap the upper portion of the stalks forwardly rather than rearwardly as shown in FIG. 4.

The device is efficient in operation, and permits adjustment of the thickness of the sprouts which are snapped off. If it is desired that only the largest sprouts be snapped off, a slight adjustment in the rotation of plate 78 can achieve this result. In such a case, the thinner sprouts would not be snapped off and would be permitted to grow for another year. Similarly, the older asparagus sprouts which are too tough, will be passed over by the machine since they will not snap as do the brittle younger plants.

It has been found that the present device can snap off the sprouts very close to the ground, a result not previously achieved with prior selective picking devices. The device will snap them off at the point where the toughened portion of the sprout ends, approximately ¼" to 1½" from the ground. Thus it can be seen that the device accomplishes at least all of its stated objectives.

What is claimed is:

1. An asparagus picking machine for picking a plurality of asparagus sprouts, each of which is extending upwardly from the ground, said sprouts differing in height and diameters from one to another, said machine comprising:
    a frame assembly;
    mounting means for mounting said frame assembly to a vehicle;
    at least a forward sprocket means and a rearward sprocket means mounted to said frame assembly for rotation about a forward horizontal axis and a rearward horizontal axis respectively, each axis being transverse to the direction of travel of said machine;
    a continuous picker belt assembly comprising a plurality of elongated spaced apart parallel picker bars extending parallel to said rotational forward and rearward axes of said sprocket means, said belt assembly further comprising chain means interconnecting said spaced apart picker bars;
    chain guide means connected to said frame assembly in a position spaced below and rearwardly from said forward sprocket means, said guide means being adapted to receive said chain means and cause said chain means to travel in an S-shaped pattern at a point below and rearward from said forward sprocket means;
    said chain means being trained around said forward and rearward sprocket means and being guided through said guide means so as to travel in a downward and rearward inclined path from said forward sprocket to said guide means and thence through an S-shaped pattern as said chain means passes through said guide means whereby said sprouts extending upwardly between said picker bars are snapped off thereby; and
    power means for causing said picker belt assembly to move continuously around said forward sprocket means, said chain guide means, and said rearward sprocket means.

2. An asparagus picking machine according to claim 1 wherein said guide means comprises a first roller and a second roller each of which is mounted for rotation about a horizontal axis, said chain means passing above one of said first and second rollers and below the other of said first and second rollers.

3. A machine according to claim 3 wherein said one of said first and second rollers is above said other of said first and second rollers.

4. A machine according to claim 2 wherein said guide means further comprises a plate member, said first and second rollers being rotatably mounted to said plate member, adjustable attachment means attaching said plate member to said frame assembly and being capable of selective rotational adjustment of the position of said plate member with respect to said frame assembly whereby only such sprouts having a diameter exceeding a selective minimum diameter are snapped off by said picker bars as said chain means travels through said S-shaped pattern.

5. A machine according to claim 4 wherein said adjustable attachment means comprises a bolt extending through said plate and said frame assembly, and a nut threadably mounted over one end of said bolt, said nut being selectively threadable to tighten or loosen the grip with which said nut and bolt hold said plate to said frame assembly.

6. A machine according to claim 1 wherein a cross conveyor is mounted to said frame assembly between said guide means and said rearward sprocket means for carrying asparagus away from said picker belt assembly in a direction parallel to the rotational axes of said sprockets.

7. A machine according to claim 6 wherein said cross conveyor comprises a pair of spaced apart conveyor rollers and a conveyor belt trained around said rollers, mechanism connecting at least one of said conveyor rollers to said power means for causing movement of said conveyor rollers and belt.

8. A machine according to claim 7 wherein a pair of idler sprockets are rotatably mounted for rotation about a horizontal axis and engage said chain means adjacent said cross conveyor, said idler sprockets causing said picker belt assembly to follow a path which causes asparagus lying on top of said spaced apart picker bars to be deposited on said cross conveyor belt.

9. A machine according to claim 1 wherein said power means comprises ground engaging wheels rotatably mounted to said frame assembly, and mechanism interconnecting said wheels to at least one of said forward and rearward sprocket means for transferring rotational movement from said wheels to said one sprocket means.

10. A machine according to claim 9 wherein said ground engaging wheels, said mechanism, and said sprockets are sized relative to one another to cause said picker belt assembly to move at a rearward lineal velocity from said forward sprocket to said guide means which causes said picker bars to remain approximately stationary with the ground during forward rolling movement of said wheels on the ground.

* * * * *